Raymond E. Kleissle
INVENTOR.

United States Patent Office 3,454,170
Patented July 8, 1969

3,454,170
WEIGHING AND LOADING SYSTEM FOR BULK MATERIAL
Raymond E. Kleissle, Houston, Tex., assignor to Best Fertilizers Co., Division of Occidental Petroleum Co., Houston, Tex., a corporation of Texas
Filed Oct. 23, 1967, Ser. No. 677,420
Int. Cl. B65g 69/00; G01g 13/16
U.S. Cl. 214—2                                6 Claims

ABSTRACT OF THE DISCLOSURE

A weighing and loading sysem for flowable bulk material. It is particularly useful for weighing and loading measured quantities of bulk flowable solid type materials, such as fertilizers and the like, into an airplane or the like.

The system includes an elevated storage bin for storing a quantity of bulk material and having delivery means near the bottom thereof for delivering the material therefrom at predetermined times. An elevated track is provided which extends generally horizontally from below the storage bin and has mounted thereon a delivery bin. The delivery bin is arranged to receive the material delivered from the storage bin and to deposit the material at a point spaced along and below the track. The delivery bin includes a depending flexible chute having valve means associated therewith for depositing the material at the deposit point at perdetermined times. Scale means are also provided below the storage bin and associated with the track for weighing batches of the material delivered to the delivery bin while the delivery bin is positioned below the storage bin.

---

This invention relates to a weighing and loading system for flowable bulk materials. More particularly, it relates to a weighing and loading system for loading measured quantities of bulk flowable solid type materials, such as fertilizers and the like, into an airplane or a vehicle, or the like.

The description hereinafter will be with respect to the weighing and the loading of fertilizers into airplanes, but it is to be understood that the invention can have other applications.

In the past, it has been common practice to ship the fertilizer to an airfield in bags, which bags were then torn open and emptied into a bin having a discharge chute at the bottom thereof. Thereafter, the bin was elevated, as by the use of a crane, hoist, or the like, and emptied into the airplane. This method of filling the airplane compartment requires that an individual count the exact number of bags which are dumped so that a farmer knows exactly how much fertilizer he is receiving. If an inaccurate count is made, then of course, the farmer will receive more or less than he is supposed to receive.

It is therefore an object of this invention to provide an improved weighing and loading system for flowable bulk materials which will provide a solution to the foregoing problem, which will permit the handling of the materials at reduced cost, and with less labor and time involved.

Briefly stated, the system of this invention includes in combination, an elevated storage bin for storing a quantity of the material and having delivery means near the bottom thereof for delivering the material therefrom at predetermined times. It also includes an elevated track extending generally horizontally from below the storage bin. A movable delivery bin is mounted on the track for reciprocal transverse therealong with the delivery bin being arranged to receive the material delivered from the storage bin and then subsequently deposit the material at a point spaced along and below the track. It also includes scale means spaced below the storage bin and associated with the track for weighing batches of the material delivered to the storage bin while the delivery bin is positioned below the storage bin.

Reference to the drawings will further explain the invention wherein like numerals refer to like parts, and in which.

Figure 1:
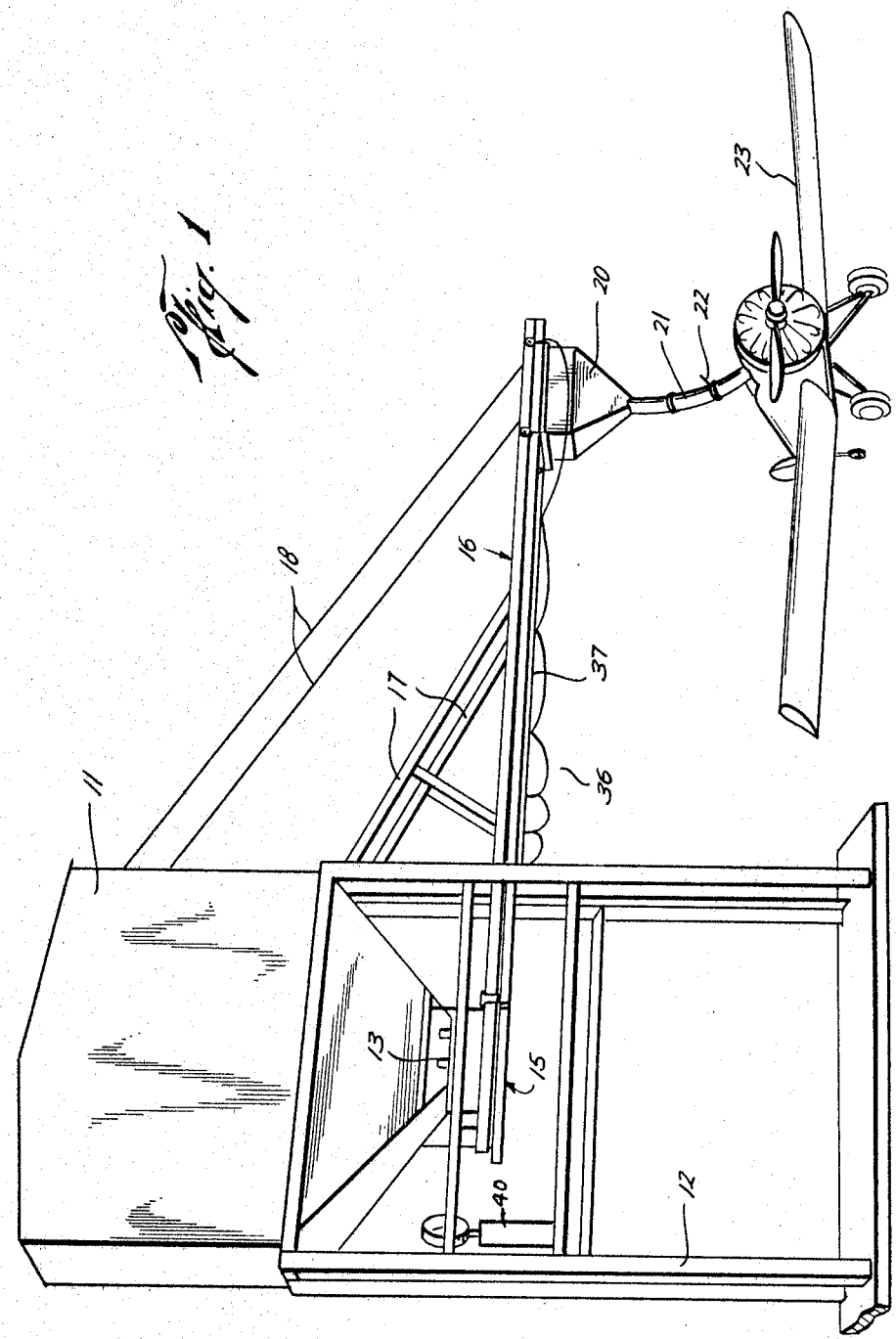
FIG. 1 is a schematic side elevation view of one presently preferred embodiment of the invention.

An elevated storage bin 11 is shown supported on a structural frame designated by the numeral 12. It is to be understood that bin 11 may comprise one or more compartments, each of which is adapted to deliver bulk material therefrom, at or near the bottom thereof. It is to be further understood that the bulk material may be supplied to the storage bin 11 from trucks or the like by any conventional means, such as mechanical elevators, pneumatic conduits, and the like, although pneumatic means are presently preferred because of the convenience and efficiency involved.

Bin 11 is shown having delivery means near the bottom thereof for delivering the material therefrom at predetermined times, which delivery means is conveniently shown in the form of a pair of slide doors 13. It is to be understood that other delivery means could be used, as for example, clam shell type doors, or the like.

The invention also includes an elevated track extending generally horizontally from below bin 11. In the preferred embodiment, the track is comprised of a vertical movable portion generally designated by the numeral 15, and a fixed portion generally designated by the numeral 16. Portion 16 is attached to frame 12 in any convenient manner and supported by struts 17 and cables 18, the latter of which are attached to an upper portion of bin 11.

The aforesaid track has mounted thereon for longitudinal traverse therealong, a movable delivery bin 20, having a depending flexible chute 21 with hand operated valve 22 therein, whereby material can be deposited from delivery bin 20 into a compartment of an airplane 23, for example, by operation of valve 22, with the airplane positioned at a point generally below and along fixed portion 16 of the track.

Figure 2:
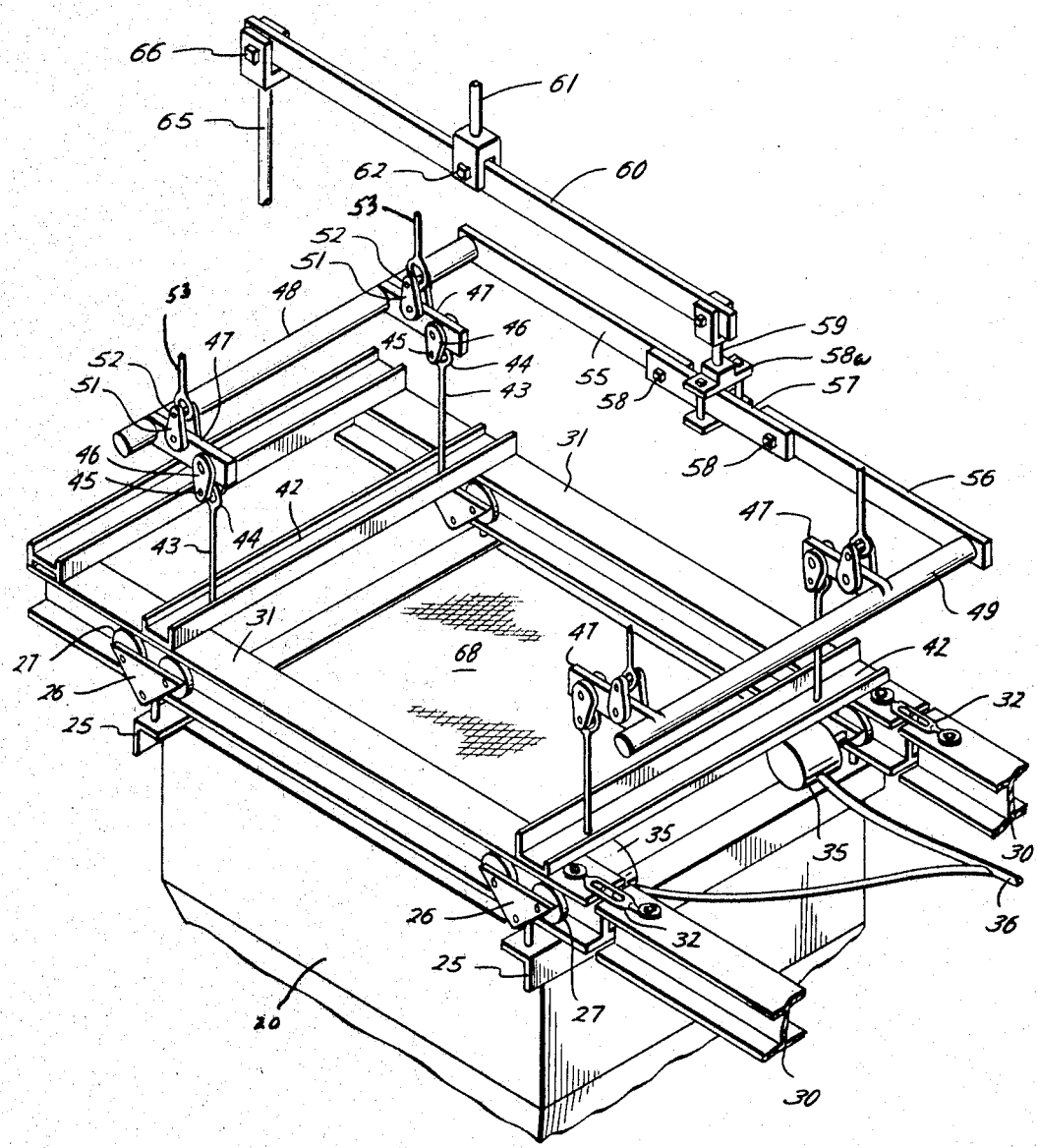
FIG. 2 is a partial isometric view of the scale means of the invention and associated parts.

Movable delivery bin 20 is supported on the track by a carriage on each corner thereof, the details of which are best shown in FIG. 2. Both the forward and rearward end of bin 20 is connected, as by welding or otherwise, to a transversely extending angle bar 25, each end of which is connected to and supported by a carriage 26, each having a pair of wheels 27 mounted therein, which wheels are adapted to run upon the lower flange of an I-beam 30. Two spaced apart I-beams 30 comprise fixed portion 16 of the track and another pair of spaced apart I-beams 31 form movable portion 15 of the track. I-beams 31 are held in end to end relationship with I-beams 30 by means of turnbuckles 32, which prevent translational movement therebetween, but which do not prevent relative vertical movement therebetween, the purpose of which will be explained hereinafter.

Delivery bin 20 also includes power means for effecting longitudinal traverse along the track formed by I-beams 30 and 31, which power means conveniently take the form of a pair of reversible electrical motors 35, each of which is attached to a wheel 27 of one of the carriages 26, and is provided with electrical power through looped conductor cable 36 which is arranged to payout and collect on fixed cable 37 extending along the side of fixed portion 16 of the track. Power is applied to conductor cable 36 from any convenient power source, which is controlled through an operating panel (not shown) which may be mounted adjacent the scale means in frame 12, which are to be described hereinafter.

The invention includes scale means spaced below storage bin 11 and associated with the track for weighing batches of material delivered to movable delivery bin 20, while delivery bin 20 is positioned below storage bin 11 and supported on I-beams 33. A scale with readout dial is designated by the numeral 40 and is of conventional type.

Referring now to FIG. 2, the details of the operating portion of the scale means will be explained in detail. I-beams 31 are held in spaced relationship by a pair of frame cross bars 42 attached as by welding or otherwise to the top sides thereof and near the ends thereof. Each of the bars 42 has attached near each end thereof and extending upwardly therefrom, a connector bolt 43 having an eyelet 44 at the upper end thereof. Each eyelet 44 has passing therethrough, and is arranged for pivoting about, a pivot pin 45 which is transversely mounted in a pair of lower lugs 46, which are attached to horizontal projections 47. It will be observed that there are a pair of horizontal projections 47 spaced above and near each end of I-beams 31, with one pair being attached to rear pivot bar 48 and another pair connected to forward pivot bar 49. Bars 48 and 49 are of generally similar construction and have projections 47 rigidly attached therewith, except that projections 47 attached to bar 48 face projections 47 on bar 49.

It will also be noted that each of the projections 47 has a pair of upwardly extending upper lugs 51 mounted intermediate the ends thereof and which have a pin 52 passing transversely therethrough. Each pin 52 is adapted for pivotal connection in the eye of a suspension bolt 53, which is securely attached to portion of storage bin 11 thereabove in any convenient manner.

Rear pivot bar 48 has rigidly attached thereto a generally horizontally extending pivot arm 55, which arm is adapted to pivot with bar 48. Similarly, forward pivot bar 49 has connected therewith pivot arm 56 which is generally similar to pivot arm 55, and adapted for rotation with pivot bar 49. Arms 55 and 56 are each connected near the ends thereof to linking strap 57 by pivot pins 58. Strap 57 is connected by connector 58a to the lower end of connector rod 59 having a bifurcated upper end, which is pivotally connected to one end of weigh bar 60.

Weigh bar 60 connected to and supported by weigh bar suspension bolt 61, the upper end of which is connected to storage bin 11 by any convenient manner, and with the lower end thereof being bifurcated and connected to weigh bar 60 by pivot pin 62.

The other end of weigh bar 60 is connected to the upper end of bifurcated scale rod 65 by pivot pin 66. Scale rod 65 is in turn connected to scale 40.

It is to be understood that bin 20 may be provided with screen covering 68, as well as doors or the like to protect the material in bin 20 after the bin is filled to the desired extent.

In operation of the system, the operator applies electrical power to motors 35 such that bin 20 is moved to the position shown in FIG. 2. That is, bin 20 is moved on to I-beams 31 which are positioned immediately below doors 13 of storage bin 11. It is to be understood that scale 40 is calibrated to 0 when bin 20 is empty. With bin 20 in the position shown in FIG. 2, the bulk material is deposited therein by the operation of doors 13, with the bulk material flowing by gravity downwardly through screen cover 68 into bin 20. The weight of the bulk material tends to cause the movable portion 15 of the track, i.e. I-beams 31 to move generally downwardly within very small limits. This downward movement causes the rotation of projections 47 downwardly on pivot bars 48 and 49, thereby causing pivot arms 55 and 56 to exert a downward force on the end of weigh bar 60 to which they are connected, which in turn exerts an upward force on scale rod 65, which, as explained above, causes the correct weight to read out on the dial of the scale 40, which can be observed visually, or can be manually recorded, or which may be arranged for automatic recording or the like.

After bin 20 is filled with the desired weight of bulk material, the delivery of bulk material thereto is stopped by closing doors 13 and bin 20 is caused to move longitudinally along the track by operation of motors 35 to a position, such as shown in FIG. 1. Thereafter, an operator can insert flexible chute 21 into an airplane compartment and, by operation of valve 22, deposit the contents, or any portion of the bulk material in bin 20 into the airplane. When the contents of bin 20 have been exhausted, it can be moved back under the storage bin 11 for a new supply by reverse operation of motors 35.

It will thus be observed tht the industry has been provided with a highly usable and efficient system for delivery of mesured quantities of bulk material such as fertilizer from a storage bin to a delivery point, such as the compartment of an airplane. The system provides for a means of providing accurate measurement of the material which is supplied to the airplane, which system operates with a minimum of labor and time required for delivery of the desired quantities of the material. It thus assures an accurate count to a farmer, for example, who may be purchasing fertilizer to be spread upon his farm by means of an airplane. It substantially eliminates any dusting problem that is normally associated with such operations. It also substantially eliminates any waste, which ordinarily occurs when handling sacked fertilizer.

What is claimed is:

1. In a weighing and loading system for flowable bulk material, the combination comprising:
    an elevated storage bin for storing a quantity of said material and having delivery means near the bottom thereof for delivering said material therefrom at predetermined times;
    an elevated track extending generally horizontally from below said storage bin;
    a movable delivery bin mounted for reciprocal traverse along said track, said delivery bin being arranged to receive said material delivered from said storage bin and to deposit said material at a point spaced along and below said track, and said delivery bin including a depending flexible chute having valve means associated therewith for depositing said material at said deposit point at predetermined times; and
    scale means spaced below said storage bin and associated with said track for weighing batches of said material delivered to said delivery bin while said delivery bin is positioned below said storage bin.

2. The invention as claimed in claim 1 wherein:
    said track includes a vertically movable portion spaced under said storage bin and a fixed portion extending from an end of said movable portion, said movable portion being arranged for vertical movement within predetermined limits in response to the weight of said material delivered to the delivery bin from said storage bin while said delivery bin is supported thereon; and
    said scale means includes a scale arranged to be responsive to said vertical movement of said movable portion of said track to thereby weigh each batch of said material delivered to said delivery bin.

3. The invention as claimed in claim 1 wherein:
    said delivery bin includes power means for effecting traverse of said delivery bin along said track.

4. The invention as claimed in claim 1 wherein:
    said delivery bin is supported on said track by a plurality of wheels arranged to engage said track.

5. The invention as claimed in claim 1 including:
    power means associated with at least one of said wheels for effecting traverse of said delivery bin along said track.

6. In a weighing and loading system for loading measured quantities of bulk flowable solid type materials such as fertilizers and the like into an airplane, the combination comprising:
- an elevated storage bin for storing a quantity of said material and having delivery means near the bottom thereof for delivering said material therefrom at predetermined times;
- an elevated track extending generally horizontally from below said storage bin, said track including a vertically movable portion spaced under said storage bin and a fixed portion extending from end of said movable portion, said movable portion being arranged for vertical movement within predetermined limits in response to the weight of delivered material supported thereon;
- a movable delivery bin mounted for reciprocal traverse along said track, said delivery bin being arranged for positioning under said storage bin on said movable portion of said track to receive said material delivered from said storage bin and to deposit said material at a point spaced along and below said fixed portion of said track, said delivery bin including a depending flexible chute having valve means associated therewith for depositing said material at a predetermined time in a compartment of an airplane positioned below said track;
- power means operatively connected to said delivery bin for effecting said traversing thereof along said track; and
- scale means spaced below said storage bin and associated with said vertically movable portion of said track for weighing batches of said material delivered to said delivery bin from said storage bin while said delivery bin is supported on said movable portion of said track, said scale means including a scale arranged to be responsive to said vertical movement of said movable portion of said track caused by the weight of material delivered to said delivery bin.

References Cited

UNITED STATES PATENTS

| | | | |
|---|---|---|---|
| 329,044 | 10/1885 | Hurd | 214—2 X |
| 2,936,994 | 5/1960 | Lau | 177—114 |
| 3,308,898 | 3/1967 | Allen et al. | 177—114 X |

ROBERT S. WARD, JR., *Primary Examiner.*

U.S. Cl. X.R.

177—59, 62, 116, 163; 214—17, 41